United States Patent
Kamitakahara et al.

(10) Patent No.: US 9,720,213 B2
(45) Date of Patent: Aug. 1, 2017

(54) INFRARED LENS UNIT, IMAGE CAPTURE MODULE, AND IMAGE CAPTURE DEVICE

(75) Inventors: Takashi Kamitakahara, Ibaraki (JP); Yoshiaki Minagawa, Ibaraki (JP); Takashi Sugiyama, Ibaraki (JP)

(73) Assignee: HITACHI MAXELL, LTD., Ibaraki-shi (JP)

( * ) Notice: Subject to any disclaimer, the term of this patent is extended or adjusted under 35 U.S.C. 154(b) by 90 days.

(21) Appl. No.: 14/237,483

(22) PCT Filed: Aug. 10, 2012

(86) PCT No.: PCT/JP2012/005122
§ 371 (c)(1),
(2), (4) Date: Feb. 6, 2014

(87) PCT Pub. No.: WO2013/021659
PCT Pub. Date: Feb. 14, 2013

(65) Prior Publication Data
US 2014/0185134 A1    Jul. 3, 2014

(30) Foreign Application Priority Data
Aug. 11, 2011   (JP) ................................. 2011-175851

(51) Int. Cl.
*G02B 13/14* (2006.01)
*G02B 13/00* (2006.01)

(52) U.S. Cl.
CPC ......... *G02B 13/14* (2013.01); *G02B 13/0035* (2013.01)

(58) Field of Classification Search
CPC ...... G02B 13/008; G02B 13/14; G02B 5/281; G02B 5/28; G02B 5/282; G02B 13/035; G02B 9/12; G02B 13/22; G02B 13/143; G02B 13/146; G02B 13/18

USPC ......................... 359/356, 355, 357, 358–361
See application file for complete search history.

(56) References Cited

U.S. PATENT DOCUMENTS

| 5,940,219 A | 8/1999 | Yamada |
| 7,085,077 B1 * | 8/2006 | Noda ................. G02B 13/0035 |
| | | 359/784 |

(Continued)

FOREIGN PATENT DOCUMENTS

| CN | 101631194 A | 1/2010 |
| JP | A 10-301022 | 11/1998 |

(Continued)

OTHER PUBLICATIONS

English translation provided for Yoshiaki (JP Patent Publication No. 2007/252831) from Espacenet.*

(Continued)

*Primary Examiner* — Darryl J Collins
*Assistant Examiner* — Journey Sumlar
(74) *Attorney, Agent, or Firm* — Oliff PLC (57) ABSTRACT

An infrared lens unit includes, in order from the object side, an aperture, a lens group, and a band-pass filter which passes a light beam of a prescribed wavelength band of the infrared region. The lens group further includes, in order from the object side, a first meniscus lens which has a positive power and is convex on the object side, a second meniscus lens which has a positive power and is convex on the image side, and a convex lens which has a positive power and is convex on the object side. The lens group further includes a near-telecentric state on the image side, wherein the angle of entry of the light beam into the band-pass filter is either 0° or close to 0°. Thus, it is possible to accurately pass a light beam of a prescribed wavelength band of the infrared region by the lens unit.

14 Claims, 6 Drawing Sheets

(56) References Cited

U.S. PATENT DOCUMENTS

| | | | |
|---|---|---|---|
| 7,564,635 B1* | 7/2009 | Tang | 359/792 |
| 2004/0190158 A1 | 9/2004 | Sato | |
| 2008/0204899 A1* | 8/2008 | Saito | 359/740 |
| 2009/0225405 A1* | 9/2009 | Fujimoto | 359/356 |
| 2009/0316025 A1 | 12/2009 | Hirai | |
| 2012/0212808 A1* | 8/2012 | Watanabe | G02B 9/16 |
| | | | 359/357 |

FOREIGN PATENT DOCUMENTS

| | | |
|---|---|---|
| JP | A 11-52227 | 2/1999 |
| JP | A 2004-53719 | 2/2004 |
| JP | A 2004-302059 | 10/2004 |
| JP | A 2005-27105 | 1/2005 |
| JP | A 2006-251001 | 9/2006 |
| JP | A 2007-94032 | 4/2007 |
| JP | A 2007-252831 | 10/2007 |
| JP | A 2008-168118 | 7/2008 |
| JP | A 2010-145648 | 7/2010 |
| JP | A 2011-53526 | 3/2011 |
| WO | WO 2010/041762 A1 | 4/2010 |

OTHER PUBLICATIONS

Nov. 6, 2012 Search Report issued in International Patent Application No. PCT/JP2012/005122 (with translation).
Apr. 29, 2015 Office Action issued in Chinese Patent Application No. 201280039235.0.

* cited by examiner

INFRARED LENS UNIT, IMAGE CAPTURE MODULE, AND IMAGE CAPTURE DEVICE

TECHNICAL FIELD

The present invention relates to an infrared lens unit equipped with an interference filter for transmitting light beams of a prescribed wavelength band of the infrared region. The present invention also relates to an image capture module equipped with such a lens unit, and an image capture device.

BACKGROUND ART

There are known distance sensors in which an infrared beam is irradiated from an illumination device onto a physical object, an image of the physical object is captured by an image capture module equipped with an image capture element, and the distance to the physical object is detected based on image data thereby obtained. The image capture module installed in such a sensor comprises a lens unit equipped with a band-pass filter for transmitting returning light of the infrared beam radiated by the illumination device from among the light reflected by the physical object, leading the returning light to the image capture element, and blocking light beams of all other wavelength bands. The band-pass filter is an interference filter in which a multilayer film is formed on the surface of a transparent substrate. Patent Document 1 discloses an interference filter for transmitting light beams of a prescribed wavelength band of the infrared region.

PRIOR ART DOCUMENTS

Patent Document

[Patent Document 1] JP2004-53719A

DISCLOSURE OF THE INVENTION

Problems to be Solved by the Invention

The interference filter has angular dependence, meaning that when the incidence angle of the light beams incident on the interference filter is inclined from 0° (perpendicular), the transmission spectrum shifts to a shorter wavelength. Therefore, to make light beams of a prescribed wavelength band set in advance reach the image capture element, the incidence angle of the light beams on the interference filter must be brought near 0° by a lens group installed in the lens unit. However, there have not yet been any proposals of lens units in which the incidence angle of the light beams on the interference filter is brought near 0° by a lens group configured from three lenses.
In view of such matters, an object of the present invention is to provide an infrared lens unit in which the incidence angle of light beams on an interference filter can be brought near 0° by a lens group configured from three lenses. Another object is to provide an image-capturing module and an image-capturing device equipped with such a lens unit.

Means to Solve the Problems

To solve the problems described above, the infrared lens unit of the present invention is characterized in comprising: a lens group configured from three lenses, and an interference filter for transmitting light beams of a prescribed wavelength band of a near-infrared region, in order from an object side toward an image side;
the lens group having, in order from the object side toward the image side, a first meniscus lens which has a positive power and is convex on the image side, a second meniscus lens which has a positive power and is convex on the image side, and a convex lens which has a positive power and is convex on the object side.

According to the present invention, the lens group comprises a telecentric state on the image side or a near-telecentric state on the image side, and light beams coming out of the lens group are parallel or nearly parallel to the optical axis. As a result, the incidence angle of light beams on the interference filter disposed on the image side of the lens group is 0° (perpendicular) or nearly 0°, and the occurrence of transmission spectrum shifts in the interference filter are prevented or suppressed. Consequently, according to the lens unit of the present invention, it is possible to accurately transmit light beams of a prescribed wavelength band in a near-infrared region, which is set in advance in the interference filter as the transmission wavelength band. Because a telecentric state on the image side or a near-telecentric state on the image side can be achieved by the lens group composed of three lenses, the overall length of the lens unit can be kept from getting too long. The incidence angle of a light beam on the interference filter is the angle where the light beam incident on the interference filter and the optical axis of the lens unit intersect. A near-infrared beam is a light beam having a wavelength in a range of 700 nm to 1100 nm.

In the present invention, the maximum value of the tangent angle of the lens surface on the object side of the convex lens is preferably 15° or greater. If so, the external peripheral side of the lens surface has greater incidence angles of light beams incident on the lens surface on the object side of the convex lens after coming out of the second meniscus lens. As a result, light beams incident on the convex lens in the external peripheral side of the lens surface are refracted in a direction toward the optical axis and are easily made parallel to the optical axis, and a telecentric state in the image side is easily achieved by the lens group. The tangent angle of the lens surface is the angle where the tangent to the lens surface and the normal to the optical axis intersect.

If the maximum value of the tangent angle of the lens surface on the object side of the convex lens is further increased, the effect of refracting light beams incident on the external peripheral side of the convex lens in a direction toward the optical axis can be increased. However, when the maximum value of the tangent angle of the lens surface on the object side of the convex lens is too large, it is difficult to separate the convex lens from the mold when the convex lens is molded, and productivity of the lens decreases. Therefore, in the present invention, molding of the convex lens is preferably made easier to maintain the productivity of the lens by keeping the maximum value of the tangent angle of the lens surface on the object side of the convex lens at 60° or less.

In the present invention, the incidence angle of light beams incident on the interference filter via the lens group and having the prescribed wavelength band of a near-infrared region is preferably 20° or less. If so, shifting of the transmission spectrum in the interference filter toward shorter wavelengths can be suppressed.

In the present invention, if the lens surface on the object side of the convex lens has an inflection point, the lens surface will have a portion that curves towards the object side, and the lens surface on the object side of the convex lens therefore preferably does not have an inflection point within the effective diameter.

In the present invention, the prescribed wavelength band can be 800 nm to 900 nm in order to transmit near-infrared beams.

When the first meniscus lens and the second meniscus lens have a large maximum value of the tangent angles of the lens surfaces, it causes problems in that it is difficult to separate the meniscus lenses from the molds when the meniscus lenses are molded and productivity of the lenses decreases. In the light of these problems, the first meniscus lens and the second meniscus lens are preferably formed from a material having a refractive index of 1.58 or greater. Specifically, if the first meniscus lens and the second meniscus lens are formed from a material having a higher refractive index than optical glass, the maximum value of the tangent angles can be kept from increasing when designing the meniscus lenses given a predetermined power, and there is no decrease in the productivity of the meniscus lenses. If the lens unit is used to capture images using 400 nm to 700 nm visible light beams, a lens composed of a material of little dispersion (a material having a high Abbe number) and a lens composed of a highly dispersive material (a material having a small Abbe number) must be combined in order to compensate for chromatic aberration, but if the lens unit captures images under light beams of a prescribed wavelength band in a near-infrared region, there is no concern for increases in chromatic aberration. Therefore, the same material having a high refractive index can be used as the material of the first meniscus lens and the second meniscus lens.

In the present invention, the first meniscus lens and the second meniscus lens preferably have an Abbe number of 35 or less. Specifically, because there is a correlation between the refractive index and the Abbe number of the materials forming the lenses, if a material having an Abbe number of 35 or less is selected, it is easy to select a material having a refractive index of 1.58 or more. If a material having a refractive index of 1.58 or more is selected, a material having an Abbe number of 35 or less is easily selected.

In this case, polycarbonate is an example of a material having a refractive index of 1.58 or more. Therefore, the first meniscus lens and the second meniscus lens can both be made of polycarbonate.

In this case, the first meniscus lens and the second meniscus lens may both be made of pigmented polycarbonate which absorbs light beams of the prescribed wavelength band. If so, light beams of unnecessary wavelength bands can be absorbed by the pigment contained in the first meniscus lens and the second meniscus lens. The pigmented polycarbonate is commercially available and is therefore easily acquired.

In the present invention, the maximum value of the tangent angle of the lens surface on the object side of the second meniscus lens is preferably 50 to 75°, and the maximum value of the tangent angle of the lens surface on the image side of the second meniscus lens is preferably 45° to 75°. If these are the maximum value ranges of the tangent angles of the lens surfaces on the object and image sides, the occurrence of astigmatism can be suppressed. It is also easier to separate the meniscus lenses from the molds when the meniscus lenses are molded.

In the present invention, it is preferable that the object side of the lens group preferably has an aperture. If so, the overall length of the lens unit can be shortened.

In the present invention, the lens unit can be a wide-angle lens having an angle of view exceeding 65°.

Next, an image capture module of the present invention is characterized in comprising the lens unit described above, and an image capture element disposed in the focal position of the lens unit. An image capture device of the present invention is characterized in comprising the image capture module described above, and an illumination device for irradiating an image-capture target with light beams of a prescribed wavelength band in the near-infrared region. With this image capture module and image capture device, an image capture target can be imaged using light beams of the prescribed wavelength band in the near-infrared region.

Effect of the Invention

According to the present invention, because the lens group configured from three lenses comprises a telecentric state in the image side or a near-telecentric state in the image side, the incidence angle of light beams on the interference filter disposed on the image side of the lens group is 0° or nearly 0°. Consequently, according to the lens unit of the present invention, it is possible to accurately transmit light beams of a prescribed wavelength band in a near-infrared region, which is set in advance in the interference filter as the transmission wavelength band. Because there are three lenses constituting the lens group, the overall length of the lens unit can be kept from getting too long.

BEST MODE FOR CARRYING OUT THE INVENTION

Embodiments of the infrared lens unit to which the present invention is applied are described below with reference to the drawings.

Embodiment 1

Figure 1:
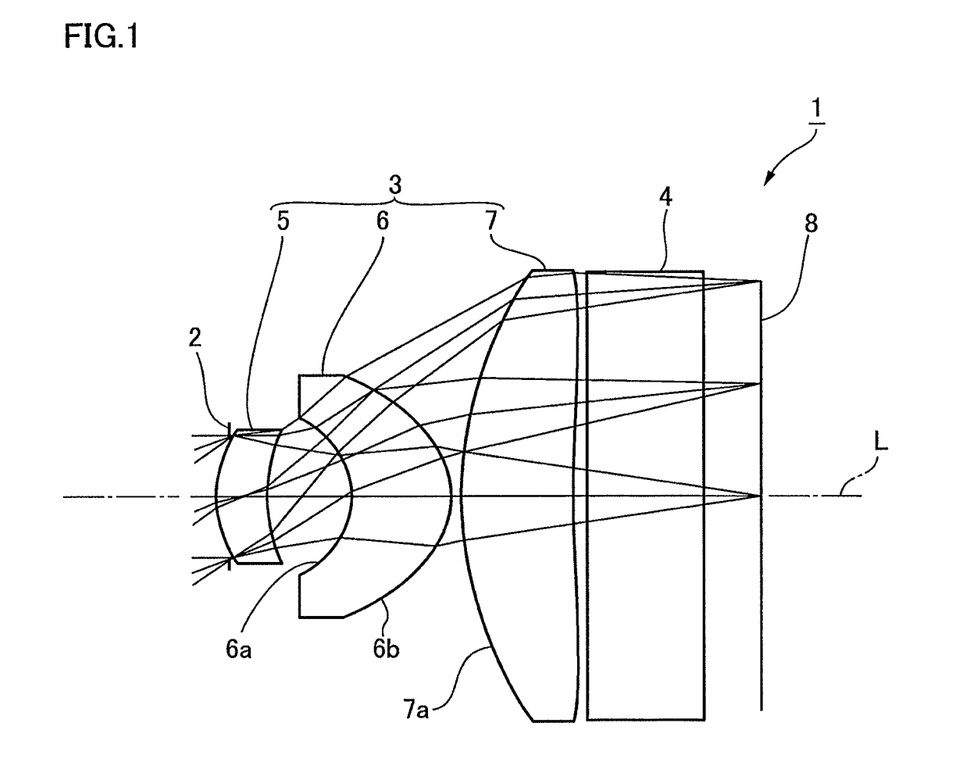
FIG. 1 is a structural diagram of the lens unit of Embodiment 1 to which the present invention is applied.

FIG. 1 is a structural diagram (a light beam diagram) of the lens unit of Embodiment 1 to which the present invention is applied. The lens unit 1 of the present example is a wide-angle lens installed in an image capture camera for capturing images using near-infrared beams. The lens unit 1 comprises, in order from an object side toward an image side (the side of an imaging surface 8), an aperture 2, a lens group 3 configured from three lenses, and a band-pass filter 4 for transmitting light beams of a prescribed wavelength band of a near-infrared region.

The band-pass filter 4 is an interference filter in which high-refractive-index material layers and low-refractive-index material layers are alternately stacked by a method such as vacuum vapor deposition or sputtering on a transparent substrate capable of transmitting infrared beams. The band-pass filter 4 of the present example, which is a near-infrared-transmitting filter, transmits light beams of a prescribed wavelength band of 800 nm to 900 nm (a near-infrared range). The band-pass filter 4 is disposed perpendicular to the optical axis L.

The lens group 3 comprises, in order from the object side toward the image side, a first meniscus lens 5 which has a positive power and is convex on the object side, a second meniscus lens 6 which has a positive power and is convex on the image side, and a convex lens 7 which has a positive power and is convex on the object side. In the present example, the first meniscus lens 5 and the second meniscus lens 6 are both molded from polycarbonate, and the convex lens 7 is molded from ZEONEX (a registered trademark).

The lens data of the lens unit 1 of the present example is as follows.

F number: 2.4
Overall focal distance: 2.47 mm
Diagonal angle of view: 69.9°
The optical length of the lens unit 1 is 4.41 mm.

Next, Table 1A shows lens data of the lens surfaces of the lens unit 1, and Table 1B shows aspherical surface coefficients for stipulating the aspherical surface shapes of lens surfaces that are deemed to be aspherical. Table 1A specifies the surfaces in order as counted from the object side. ST is the aperture surface, and the aperture surface is the first surface. The tenth surface is the imaging surface. In the present example, the first meniscus lens 5, the second meniscus lens 6, and the convex lens 7 have aspherical lens surfaces on both the object side and the image side.

The aspherical surface shapes used in the lens surfaces are expressed by the following formula, where Y is the amount of sag, c is the curvature, K is the constant of the cone, h is the light beam height, and the fourth-order, sixth-order, eighth-order, tenth-order, twelfth-order, fourteenth-order, and sixteenth-order aspherical surface constants are A4, A6, A8, A10, A12, A14, and A16, respectively.

$$Y(h) = \frac{ch^2}{1 + \sqrt{1 - (K+1)c^2h^2}} + A_4h^4 + A_6h^6 + A_8h^8 + A_{10}h^{10} + A_{12}h^{12} + A_{14}h^{14} + A_{16}h^{16}$$ [Formula 1]

Figure 2:
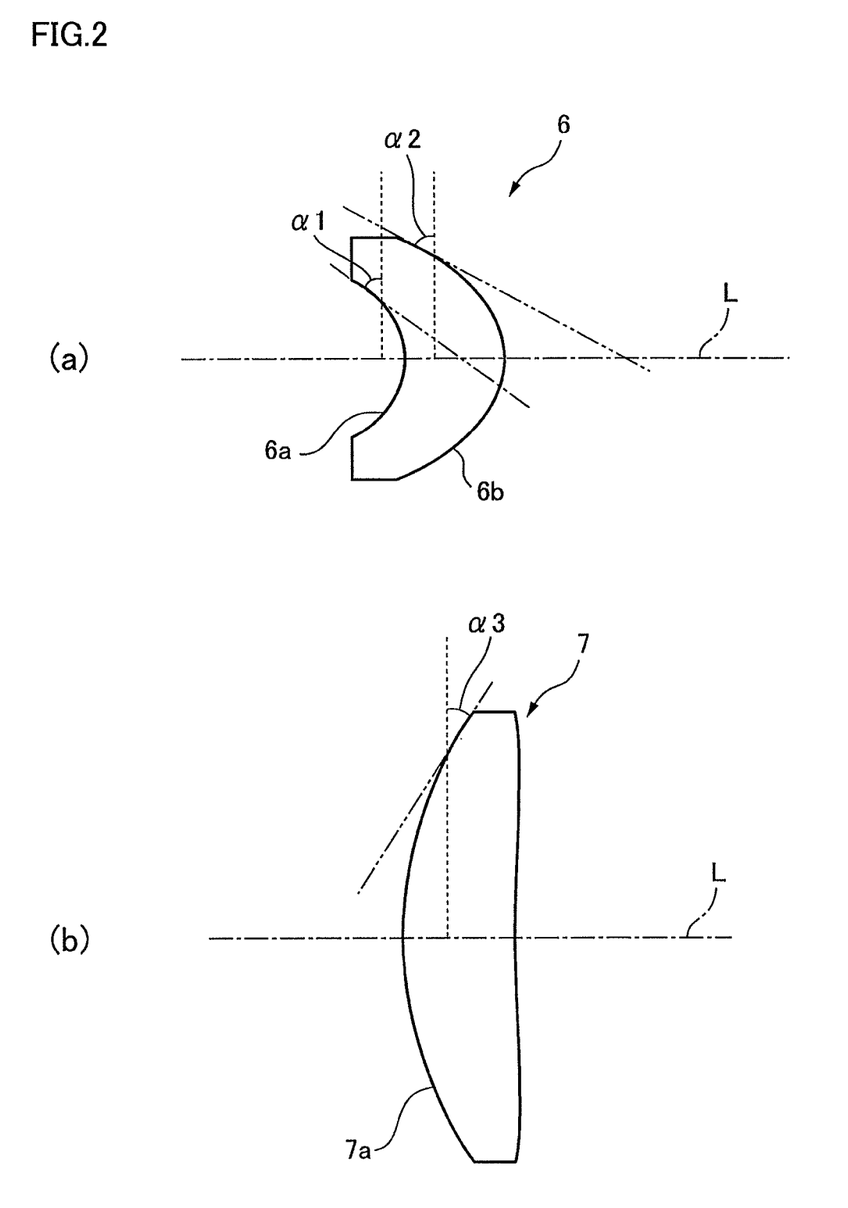
FIG. 2 depicts illustrative drawings of the shape of the second meniscus lens and the convex lens.

FIG. 2(a) is an explanatory drawing of the shape of the second meniscus lens 6, and FIG. 2(b) is an explanatory drawing of the shape of the convex lens 7. The lens surface 6a (the fourth surface) on the object side of the second meniscus lens 6 has a maximum value of the tangent angle α1 exceeding 55°, as shown in FIG. 2(a). The incidence angle of a light beam incident on the lens surface 6a is thereby larger in the external peripheral side, and light beams incident on the second meniscus lens 6 in the external peripheral side of the lens surface 6a are greatly bent up (refracted in a direction away from the optical axis L) as shown in FIG. 1. The tangent angle of the lens surface is the angle within the effective diameter of the lens where the tangent to the lens surface and the normal to the optical axis L intersect.

If the maximum value of the tangent angle α1 of the lens surface 6a on the object side of the second meniscus lens 6 is 50° or greater, the necessary effect of bending up the light beams can be obtained. If the maximum value of the tangent angle α1 is 55° or greater, a sufficient effect of bending up the light beams can be obtained. When the maximum value of the tangent angle α1 of the lens surface 6a is too large, it is difficult to measure the lens surface 6a with a three-dimensional measurement device. Another result of the maximum value of the tangent angle α1 of the lens surface 6a being too large is that it is difficult to separate the second meniscus lens 6 from the mold when the second meniscus lens 6 is molded, and productivity of the second meniscus lens 6 decreases. Therefore, the maximum value of the tangent angle α1 of the lens surface 6a is preferably 75° or less, and in view of the ease of separation from the mold (separability) and the precision of measuring the lens surface 6a, the maximum value of the tangent angle is preferably lessened to maintain productivity of the second meniscus lens 6. To keep the occurrence of astigmatism low, the maximum value of the tangent angle α1 of the lens surface 6a is preferably 55° or greater and 65° or less, and in the present example the maximum value of the tangent angle α1 of the lens surface 6a is 63°.

TABLE 1A

| Surface | Curvature radius | Surface gap | nd (refractive index) | vd (Abbe number) |
|---|---|---|---|---|
| ST (aperture surface) | Infinity | −0.111 | | |
| 2nd surface | 1.13 | 0.420 | 1.59 | 30.5 |
| 3rd surface | 2.12 | 0.677 | | |
| 4th surface | −0.79 | 0.803 | 1.59 | 30.5 |
| 5th surface | −0.82 | 0.082 | | |
| 6th surface | 3.27 | 0.909 | 1.54 | 56 |
| 7th surface | 4.49 | 0.109 | | |
| 8th surface | Infinity | 0.950 | 1.52 | 60 |
| 9th surface | Infinity | 0.460 | | |
| 10th surface | Infinity | — | | |

TABLE 1B

| | 2nd surface | 3rd surface | 4th surface | 5th surface | 6th surface | 7th surface |
|---|---|---|---|---|---|---|
| k | −2.837037 | 10.715680 | −0.513237 | −0.717803 | 0.535402 | 3.331516 |
| A4 | 0.341374 | 0.036462 | −0.355425 | −0.055939 | −0.017366 | −0.098042 |
| A6 | 0.047254 | −0.125235 | −0.604980 | −0.028186 | 0.003427 | 0.025058 |
| A8 | 0.424098 | 0.827516 | −0.540299 | −0.158701 | 0.008941 | 0.000980 |
| A10 | −0.065033 | −0.908884 | 0.900269 | 0.355733 | −0.006282 | −0.002443 |
| A12 | −0.122804 | −0.248086 | −2.608474 | −0.541822 | 0.001706 | 0.000744 |
| A14 | 0.656088 | −1.800586 | −2.822864 | 0.309728 | −0.000174 | −0.000095 |
| A16 | 2.230804 | −4.441837 | 13.361566 | −0.014524 | −0.000001 | −0.000001 |

The lens surface 6b (the fifth surface) on the image side of the second meniscus lens 6 has a maximum value of the tangent angle α2 exceeding 50°, as shown in FIG. 2(a). The incidence angle of a light beam incident on the lens surface 6b is thereby larger, and light beams outgoing from the second meniscus lens 6 are greatly bent down (refracted in directions toward the optical axis L) in the external peripheral side of the lens surface 6b, as shown in FIG. 1.

If the maximum value of the tangent angle α2 of the lens surface 6b on the image side of the second meniscus, lens 6 is 45° or greater, the necessary effect of bending down light beams can be achieved, and if the maximum value of the tangent angle α2 is 50° or greater, a sufficient effect of bending down light beams can be achieved. When the maximum value of the tangent angle α2 of the lens surface 6b is too large, it is difficult to measure the lens surface 6b with a three-dimensional measurement device. Another result of the maximum value of the tangent angle α2 of the lens surface 6b being too large is that it is difficult to separate the second meniscus lens 6 from the mold when the second meniscus lens 6 is molded, and productivity of the second meniscus lens 6 decreases. Therefore, the maximum value of the tangent angle α2 is preferably 75° or less, and in view of the ease of separation from the mold (separability) and the precision of measuring the lens surface 6b, the maximum value of the tangent angle is preferably lessened to maintain productivity of the second meniscus lens 6. To keep the occurrence of astigmatism low, the maximum value of the tangent angle α2 of the lens surface 6b is preferably 50° or greater and 68° or less, and in the present example the maximum value of the tangent angle α2 of the lens surface 6b is 65°.

Furthermore, a lens surface 7a (the sixth surface) on the object side of the convex lens 7 has a maximum value of the tangent angle α3 exceeding 20°, as shown in FIG. 2(b). The external peripheral side has greater incidence angles of light beams incident on the lens surface 7a after coming out of the second meniscus lens 6, and light beams incident on the convex lens 7 in the external peripheral side of the lens surface 7a are greatly bent down (refracted in directions toward the optical axis L) as shown in FIG. 1.

If the maximum value of the tangent angle α3 of the lens surface 7a on the object side of the convex lens 7 is 15° or greater, the necessary effect of bending down light beams can be achieved, and if the maximum value of the tangent angle α3 is 20° or greater, a sufficient effect of bending down light beams can be achieved. If the maximum value of the tangent angle α3 of the lens surface 7a is further increased, the effect of refracting light beams incident on the convex lens 7 in a direction toward the optical axis L can be increased, but when the maximum value of the tangent angle α3 of the lens surface 7a is too large, it is difficult to separate the convex lens 7 from the mold when the convex lens 7 is molded, and productivity of the convex lens 7 decreases. In view of this, the productivity of the lens is preferably maintained by keeping the maximum value of the tangent angle α3 at 60° or less. To keep the occurrence of aberrations low, the maximum value of the tangent angle α3 of the lens surface 7a is preferably 40° or less, and in the present example the lens surface 7a has a maximum value of the tangent angle α3 of 28.3°.

(Operational Effects)

According to the lens unit 1 of the present example, the lens group 3, which comprises the first meniscus lens 5, the second meniscus lens 6, and the convex lens 7 as shown in FIG. 1, comprises a near-telecentric state on the image side, and light beams coming out of the lens group 3 are parallel or nearly parallel to the optical axis L. As a result, the incidence angle of light beams on the band-pass filter 4 disposed on the image side of the lens group 3 is 0° (perpendicular) or nearly 0°. Table 2 shows the relationship between image height and the incidence angle of light beams on the band-pass filter 4 (BPF). The incidence angle of a light beam on the band-pass filter 4 is the angle where the light beam incident on the band-pass filter 4 and the optical axis L intersect.

TABLE 2

| Image Height (%) | Main light beam incidence angle on BPF (°) | Upper light beam incidence angle on BPF (°) | Lower light beam incidence angle on BPF (°) |
|---|---|---|---|
| 0 | 0.0 | 12.1 | 12.1 |
| 10 | 1.7 | 10.3 | 13.7 |
| 20 | 3.3 | 8.4 | 15.1 |
| 30 | 4.9 | 6.4 | 16.3 |
| 40 | 6.4 | 4.4 | 17.3 |
| 50 | 7.7 | 2.5 | 18.1 |
| 60 | 8.8 | 0.8 | 18.5 |
| 70 | 9.5 | 0.6 | 18.4 |
| 80 | 9.8 | 1.6 | 17.9 |
| 90 | 9.3 | 1.9 | 16.7 |
| 100 | 6.7 | 0.5 | 13.4 |

As shown in Table 2, in the present example, the incidence angle of light beams incident on the band-pass filter 4 via the lens group 3 is less than 20°. Therefore, the occurrences of transmission spectrum shifts in the band-pass filter 4 are prevented or suppressed. Consequently, according to the lens unit 1 of the present example, it is possible to accurately transmit light beams of a wavelength band of 800 to 900 nm, which is set in advance in the band-pass filter 4 as the transmission wavelength band. Because a near-telecentric state in the image side is achieved by the lens group 3 composed of three lenses, the overall length of the lens unit 1 is kept from getting too long.

Figure 3:
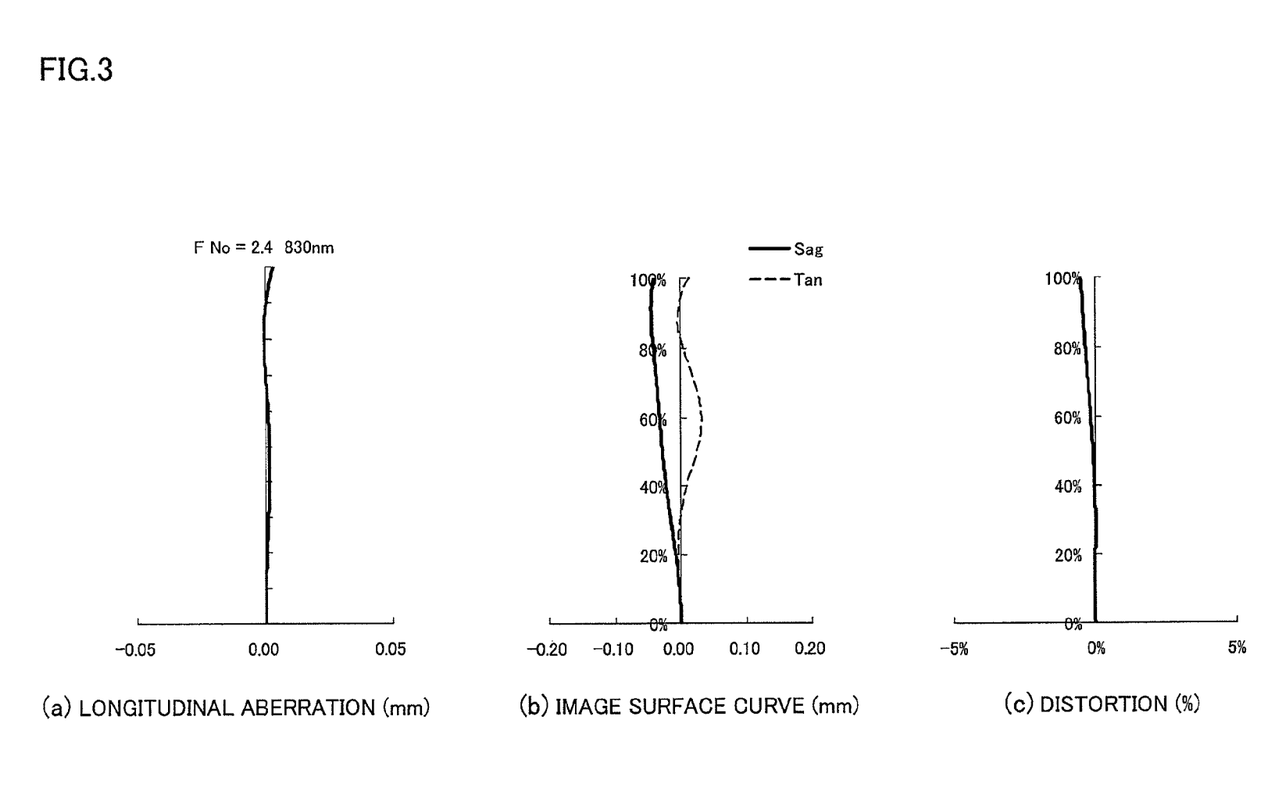
FIG. 3 is a longitudinal aberration view, an image surface curve view, and a distortion view of the lens unit of Embodiment 1 with a light beam having a wavelength of 830 nm.

Furthermore, according to the lens unit 1 of the present example, spherical aberrations, image surface curves, and distortions relative to the optical axis of the prescribed wavelength band of a near-infrared region are satisfactorily corrected as shown in FIG. 3. FIGS. 3(a) to (c) are, respectively, a longitudinal aberration view, an image surface curve view, and a distortion view of the lens unit 1 with a light beam having a wavelength of 830 nm. In FIG. 3(a), the horizontal axis represents the position where the light beam crosses the optical axis L, and the vertical axis represents the height where the light beam is incident on the lens group 3. In FIG. 3(b), the horizontal axis represents the distance along the optical axis L, and the vertical axis represents the height of the image. The solid line represents image surface curve aberration in the sagittal plane, and the dashed line represents image surface curve aberration in the tangential plane. In FIG. 3(c), the horizontal axis represents the amount of strain in the image, and the vertical axis represents the height of the image.

When the meniscus lenses have a large maximum value of the tangent angles of the lens surfaces, it causes problems in that it is difficult to separate the meniscus lenses from the molds when the meniscus lenses are molded and productivity of the lenses decreases, but according to the present example, the maximum value of the tangent angles can be kept from increasing when designing the meniscus lenses 5, 6 given a predetermined power because the first meniscus lens 5 and the second meniscus lens 6 are formed from polycarbonate having a high refractive index (a refractive index of 1.58 or more). Therefore, there is no decrease in the productivity of the first meniscus lens 5 and the second meniscus lens 6. If the lens unit 1 is used to capture images using 400 nm to 700 nm visible light beams, a lens composed of a material of little dispersion (a material having a high Abbe number) and a lens composed of a highly dispersive material (a material having a small Abbe number) must be combined in order to compensate for chromatic aberration, but because the lens unit 1 of the present example captures images under light beams of a near-infrared prescribed wavelength band in a near-infrared region, there is no concern for increases in chromatic aberration. Therefore, the same material can be used as the material of the first meniscus lens 5 and the second meniscus lens 6, and polycarbonate can be used as the material of these meniscus lenses. An example of a polycarbonate suitable for molding these lenses is "SP-1516" made by Teijin Chemicals, Ltd., for example.

As shall be apparent, a material having a higher refractive index than polycarbonate, e.g., polyester or the like, may also be used as the material of the first meniscus lens 5 and the second meniscus lens 6. "OKP4HT" made by Osaka Gas Chemicals Co., Ltd., for example, is an example of a polyester suitable for forming the lenses. The first meniscus lens 5 and the second meniscus lens 6 may be formed from different materials if the materials have a refractive index of 1.58. Because there is a correlation between the refractive index and the Abbe number of the materials forming the lenses, if a material having an Abbe number of 35 or less is selected, it is easy to select a material having a refractive index of 1.58 or more as the material for forming the first meniscus lens 5 and the second meniscus lens 6, as shown in Table 1A.

In the present example, of the three lenses constituting the lens group 3, the lens nearest the image side is the convex lens 7 which is convex toward the object side, thereby ensuring back focus, whereby a space is ensured for placing the band-pass filter 4 between the imaging surface 8 and the lens group 3. The lens surface 7a on the object side of the convex lens 7 does not have an inflection point within the effective diameter, and the lens surface 7a therefore has no portion curving toward the object side, which is advantageous in achieving a telecentric state on the image side. Furthermore, in the present example, the overall length of the lens unit 1 is shortened by placing the aperture 2 on the object side of the lens group 3.

Modification of Embodiment 1

In the embodiment described above, the first meniscus lens 5 and the second meniscus lens 6 can be made from pigmented polycarbonate. If so, light beams of unnecessary wavelength bands can be absorbed by the pigment. Specifically, depending on the band-pass filter, there are those which are unable to completely shield against light beams in the visible light region and light beams in the near-infrared region but do transmit light beams of a prescribed wavelength band within these light beams. When such a band-pass filter is used, if the light beams of this prescribed wavelength band are absorbed by the pigment contained in the first meniscus lens 5 and the second meniscus lens 6, it is possible to reliably transmit only the light beams of the prescribed wavelength band of a near-infrared region. Because pigmented polycarbonate is commercially available and is easily acquired, it is suitable for lens mass production. An example of a material in which such a pigment is mixed is "IUPION (registered trademark) S-3000R WL700" made by Mitsubishi Engineering-Plastics Corporation, for example. Another example is "PANLITE (registered trademark) L-1225L/HF05100L" made by Teijin Chemicals, Ltd.

The convex lens 7 can also be made of polycarbonate. Furthermore, axial chromatic aberration of the light beams of the prescribed wavelength band in a near-infrared region can be suppressed by making the convex lens 7 from a material having a greater Abbe number than the first meniscus lens 5 and the second meniscus lens 6.

In the example described above, the band-pass filter 4 transmits near-infrared beams, but light beams of the prescribed wavelength band in a near-infrared region transmitted by the band-pass filter 4 are not limited to the wavelength band described above. The present invention can be applied to a lens unit equipped with a band-pass filter having a bandwidth of about 100 nm in the transmission wavelength band.

Embodiment 2

Figure 4:
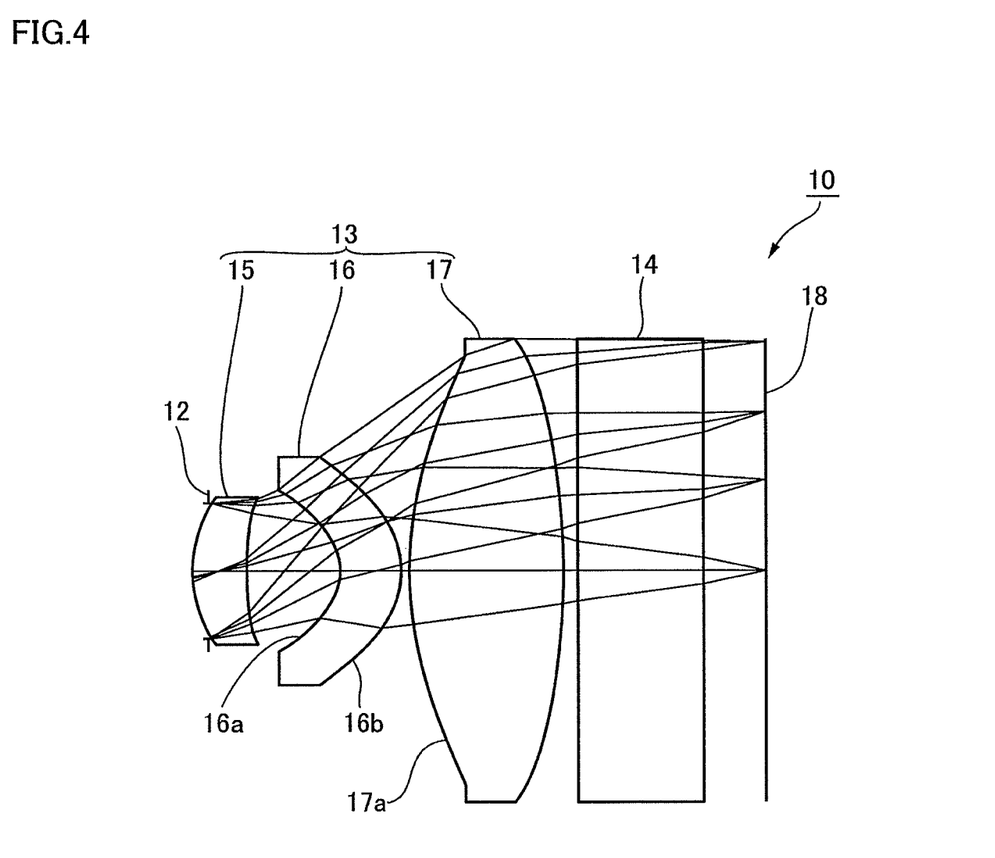
FIG. 4 is a structural diagram of the lens unit of Embodiment 2 to which the present invention is applied.

FIG. 4 is a structural diagram (light beam diagram) of the lens unit of Embodiment 2 to which the present invention is applied. The lens unit 10 of the present example is a wide-angle lens installed in an image capture camera for capturing images using near-infrared beams, similar to the lens unit 1 of Embodiment 1. The lens unit 10 comprises, in order from an object side toward an image side (the side of an imaging surface 18), an aperture 12, a lens group 13 configured from three lenses, and a band-pass filter 14 for transmitting light beams of a prescribed wavelength band of a near-infrared region. The band-pass filter 14, which is a near-infrared beam transmitting filter similar to the band-pass filter 4 of Embodiment 1, transmits light beams of a prescribed wavelength band (near-infrared region) of 800 nm to 900 nm. The band-pass filter 14 is disposed perpendicular to the optical axis L.

The lens group 13 comprises, in order from the object side toward the image side, a first meniscus lens 15 which has a positive power and is convex on the object side, a second meniscus lens 16 which has a positive power and is convex on the image side, and a convex lens 17 which has a positive power and is convex on the object side and the image side. The first meniscus lens 15 and the second meniscus lens 16 are both molded from polycarbonate, and the convex lens 17 is molded from ZEONEX (a registered trademark).

The lens data of the lens unit 10 of the present example is as follows.

F number: 2.4

Overall focal distance: 2.47 mm

Diagonal angle of view: 69.6°

The optical length of the lens unit 10 is 4.31 mm.

Next, Table 3A shows lens data of the lens surfaces of the lens unit 10. Table 3A specifies the surfaces in order as counted from the object side. ST is the aperture surface, and the aperture surface is the first surface. The tenth surface is the imaging surface. Table 3B shows aspherical surface coefficients for stipulating the aspherical surface shapes of lens surfaces that are deemed to be aspherical. The aspherical surface shapes are expressed by the formula shown in Embodiment 1. In the present example, the first meniscus lens 15, the second meniscus lens 16, and the convex lens 17 have aspherical lens surfaces on both the object side and the image side.

TABLE 3A

| Surface | Curvature radius | Surface gap | nd (refractive index) | vd (Abbe number) |
|---|---|---|---|---|
| ST (aperture surface) | Infinity | −0.111 | | |
| 2nd surface | 1.10 | 0.400 | 1.58 | 30 |
| 3rd surface | 2.15 | 0.704 | | |
| 4th surface | −0.52 | 0.460 | 1.58 | 30 |
| 5th surface | −0.68 | 0.050 | | |
| 6th surface | 2.69 | 1.180 | 1.53 | 56 |
| 7th surface | −10.00 | 0.109 | | |
| 8th surface | Infinity | 0.950 | 1.52 | 60 |
| 9th surface | Infinity | 0.458 | | |
| 10th surface | Infinity | — | | |

TABLE 3B

| | 2nd surface | 3rd surface | 4th surface | 5th surface | 6th surface | 7th surface |
|---|---|---|---|---|---|---|
| k | −2.626798 | 11.301940 | −0.742789 | −0.514860 | 0.252497 | 0.000000 |
| A4 | 0.342373 | −0.032449 | −0.421657 | −0.010304 | −0.021217 | −0.065488 |
| A6 | 0.060966 | 0.070648 | 0.147456 | 0.090778 | 0.000706 | 0.028876 |
| A8 | 0.296821 | −0.034493 | −2.450534 | 0.065587 | 0.007191 | −0.001342 |
| A10 | −0.776878 | −2.483372 | 12.852944 | 0.302671 | −0.006084 | −0.002563 |
| A12 | 2.311791 | 3.760874 | −18.614910 | −0.449690 | 0.001840 | 0.000762 |
| A14 | 3.498317 | 7.598458 | −39.914406 | 0.697979 | −0.000185 | −0.000099 |
| A16 | −3.159976 | −24.166130 | 97.482506 | 0.0058237 | −0.000015 | −0.000001 |

In the present example, the lens surface 16a (the fourth surface) on the object side of the second meniscus lens 16 has a maximum value of the tangent angle α1 of 61°. Therefore, as shown in FIG. 4, the light beam incident on the second meniscus lens 16 in the external peripheral side of the lens surface 16a is greatly bent up. Specifically, the necessary effect of bending up light beams can be achieved because the maximum value of the tangent angle α1 of the lens surface 16a is 50° or more. A sufficient effect of bending up light beams can be achieved because the maximum value of the tangent angle α1 of the lens surface 16a is 55° or more. Furthermore, because the maximum value of the tangent angle α1 of the lens surface 16a is 75° or less, the second meniscus lens 16 has good separability when molded. The lens shape can be measured precisely because the maximum value of the tangent angle α1 of the lens surface 16a is 65° or less, and the productivity of the second meniscus lens 16 can be maintained.

Furthermore, in the present example, the lens surface 16b (the fifth surface) on the image side of the second meniscus lens 16 has a maximum value of the tangent angle α2 of 52°. Therefore, light beams outgoing from the second meniscus lens 16 are greatly bent down (refracted in directions toward the optical axis L) in the external peripheral side of the lens surface 16b, as shown in FIG. 4. Specifically, the necessary effect of bending down light beams can be achieved because the maximum value of the tangent angle α2 of the lens surface 16b is 45° or more. A sufficient effect of bending down light beams can be achieved because the maximum value of the tangent angle α2 of the lens surface 16b is 50° or more. Furthermore, because the maximum value of the tangent angle α2 of the lens surface 16b is 75° or less, the second meniscus lens 16 has good separability when molded. The lens shape can be measured precisely because the maximum value of the tangent angle α2 of the lens surface 16b is 68° or less, and the productivity of the second meniscus lens 16 can be maintained.

In the present example, a lens surface 17a (the sixth surface) on the object side of the convex lens 17 has a maximum value of the tangent angle α3 of 23.3°, which exceeds 20°. Therefore, the external peripheral side has greater incidence angles of light beams incident on the lens surface 17a after coming out of the second meniscus lens 16, and light beams incident on the convex lens 17 in the external peripheral side of the lens surface 17a are greatly bent down (refracted in directions toward the optical axis L) as shown in FIG. 4. The necessary effect of bending down light beams can be achieved because the maximum value of the tangent angle α3 of the lens surface 17a is 15° or more. A sufficient effect of bending down light beams can be achieved because the maximum value of the tangent angle α3 of the lens surface 17a is 20° or more. Furthermore, because the maximum value of the tangent angle α3 of the lens surface 17a is 60° or less, the convex lens 17 has good separability when molded. The occurrence of aberrations can be suppressed because the maximum value of the tangent angle α3 of the lens surface 17a is 40° or less.

(Operational Effects)

According to the lens unit 10 of the present example, the lens group 13, which comprises the first meniscus lens 15, the second meniscus lens 16, and the convex lens 17 as shown in FIG. 4, comprises a near-telecentric state on the image side, and light beams coming out of the lens group 13 are parallel or nearly parallel to the optical axis L. As a result, the incidence angle of light beams on the band-pass filter 14 disposed on the image side of the lens group 13 is 0° (perpendicular) or nearly 0°. Table 4 shows the relationship between image height and the incidence angle of light beams on the band-pass filter 14 (BPF).

TABLE 4

| Image Height (%) | Main light beam incidence angle on BPF (°) | Upper light beam incidence angle on BPF (°) | Lower light beam incidence angle on BPF (°) |
|---|---|---|---|
| 0 | 0.0 | 12.1 | 12.1 |
| 10 | 1.6 | 10.3 | 13.6 |
| 20 | 3.2 | 8.4 | 15.0 |
| 30 | 4.7 | 6.5 | 16.1 |
| 40 | 6.1 | 4.7 | 17.0 |
| 50 | 7.3 | 2.9 | 17.6 |
| 60 | 8.3 | 1.1 | 18.0 |
| 70 | 9.2 | 0.4 | 18.0 |
| 80 | 9.6 | 1.6 | 17.7 |
| 90 | 9.3 | 2.0 | 16.7 |
| 100 | 6.9 | 0.3 | 13.5 |

As shown in Table 4, in the present example, the incidence angle of light beams incident on the band-pass filter 14 via the lens group 13 is less than 20°. Therefore, the occurrences of transmission spectrum shifts in the band-pass filter 14 are prevented or suppressed. Consequently, according to the lens unit 10 of the present example, it is possible to accurately transmit light beams of a wavelength band of 800 to 900 nm, which is set in advance in the band-pass filter 14 as the transmission wavelength band. Because a near-telecentric state in the image side is achieved by the lens group 13 composed of three lenses, the overall length of the lens unit 10 is kept from getting too long.

Figure 5:
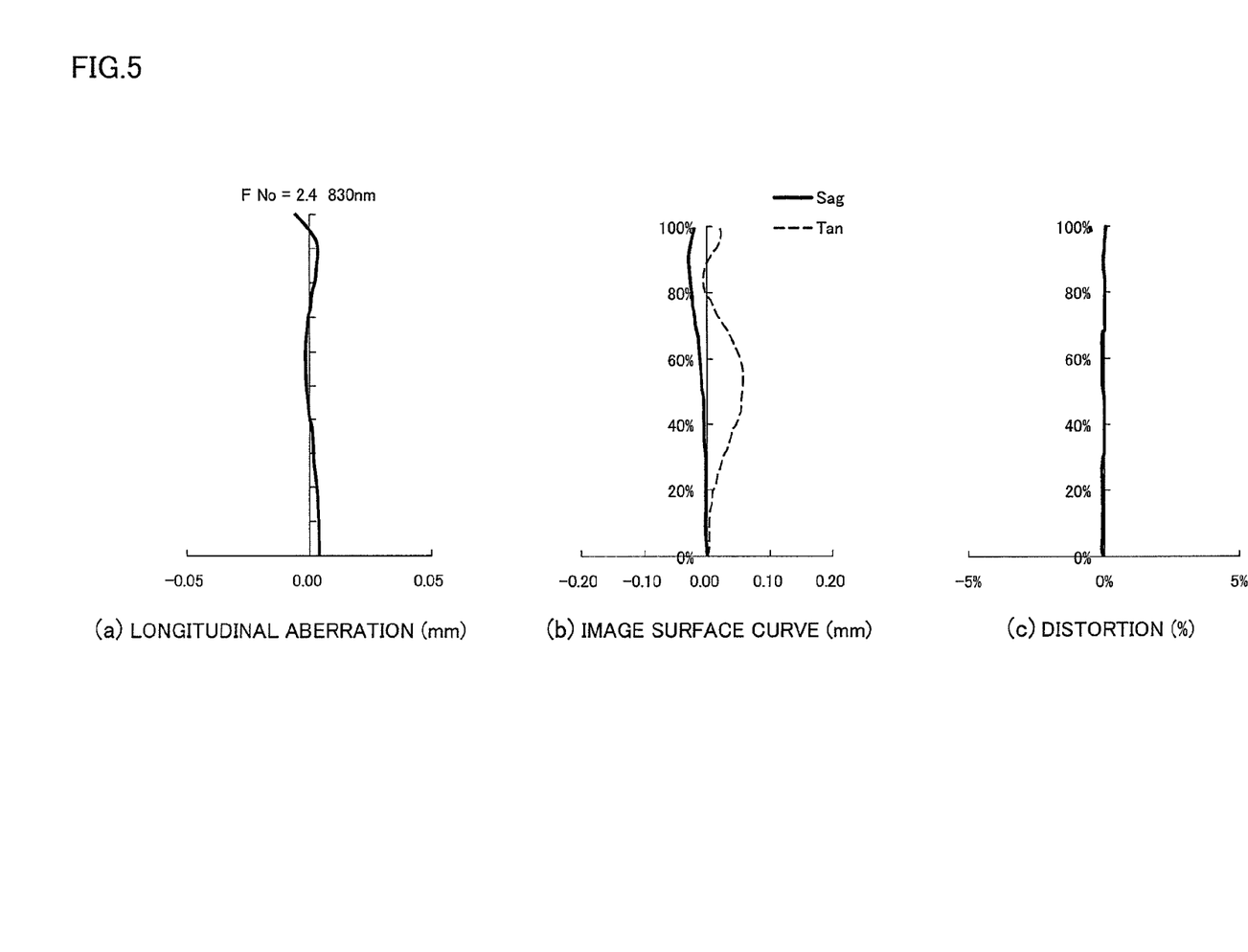
FIG. 5 is a longitudinal aberration view, an image surface curve view, and a distortion view of the lens unit of Embodiment 2 with a light beam having a wavelength of 830 nm.

Furthermore, according to the lens unit 10 of the present example, spherical aberrations, image surface curves, and distortions relative to the optical axis of the prescribed wavelength band of a near-infrared region are satisfactorily corrected as shown in FIG. 5. FIGS. 5(a) to (c) are, respectively, a longitudinal aberration view, an image surface curve view, and a distortion view of the lens unit 10 with a light beam having a wavelength of 830 nm.

In the present example, the maximum value of the tangent angles can be kept from increasing when designing the meniscus lenses 15, 16 given a predetermined power because the first meniscus lens 15 and the second meniscus lens 16 are formed from polycarbonate having a high refractive index (a refractive index of 1.58 or more). Therefore, there is no decrease in the productivity of the first meniscus lens 15 and the second meniscus lens 16. A material having a higher refractive index than polycarbonate may also be used as the material of the first meniscus lens 15 and the second meniscus lens 16.

Furthermore, in the present example, of the three lenses constituting the lens group 13, the lens nearest the image side is the convex lens 17 which is convex toward the object side, thereby ensuring back focus, whereby a space is ensured for placing the band-pass filter 14 between the imaging surface 18 and the lens group 13. The lens surface 17a on the object side of the convex lens 17 does not have an inflection point within the effective diameter, and the lens surface 17a therefore has no portion curving toward the object side, which is advantageous in achieving a telecentric state on the image side. Furthermore, in the present example, the overall length of the lens unit 10 is reduced by placing the aperture 12 on the object side of the lens group 13.

In the lens unit 10 of the present example, the first meniscus lens 15 and the second meniscus lens 16 can be made of a pigmented polycarbonate. The convex lens 17 can also be made of a pigmented polycarbonate. Furthermore, axial chromatic aberration of the light beams of the prescribed wavelength band in a near-infrared region can be suppressed by making the convex lens 17 from a material having a greater Abbe number than the first meniscus lens 15 and the second meniscus lens 16. The light beams of the prescribed wavelength band in a near-infrared region transmitted by the band-pass filter 14 are not limited to the wavelength band described above.

(Image Capture Module and Image Capture Device)

Figure 6:
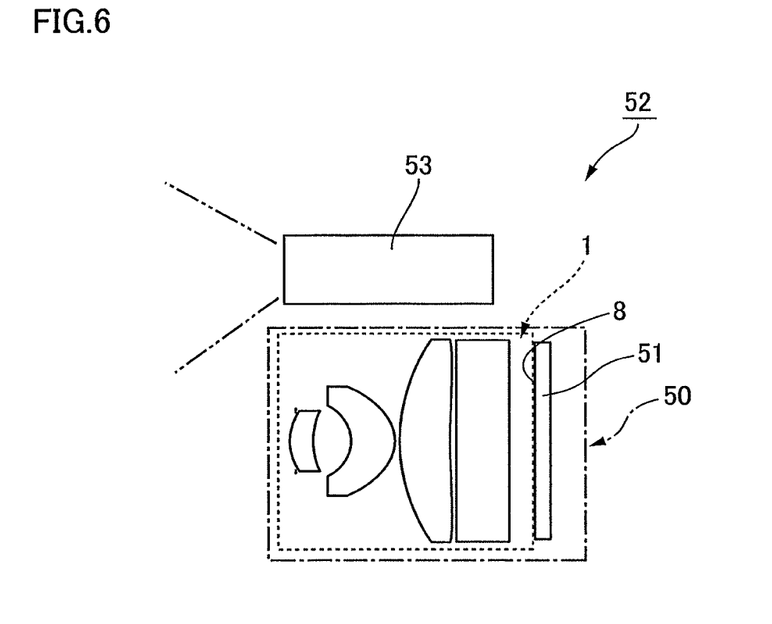
FIG. 6 is an explanatory view of an image-capturing module and an image-capturing device equipped with the lens unit.

FIG. 6 is an explanatory view of an image capture device comprising an image capture module equipped with the lens unit 1 of the present invention. An image capture module 50 equipped with the lens unit 1 comprises an image capture element 51 in the imaging surface (the focal position) 8 of the lens unit 1, as shown in FIG. 6. The image capture element 51 is a CCD sensor or a CMOS sensor capable of receiving light beams up to a near-infrared region of about 1300 nm from the visible light region. An image capture device 52 comprises the image capture module 50, and an infrared illumination device 53 for irradiating light beams including the prescribed wavelength band transmitted by the band-pass filter 4, i.e., light beams including a near-infrared region in a wavelength band of 800 nm to 900 nm. According to the image capture module 50 and the image capture device 52 of the present example, an image of a target can be captured using light beams of a prescribed wavelength band in a near-infrared region. The lens unit 10 can also be installed in the image capture module 50 in place of the lens unit 1.

The invention claimed is:

1. An infrared lens unit comprising:
a lens group configured from three lenses, and an interference filter for transmitting light beams of a prescribed wavelength band of a near-infrared region, in order from an object side toward an image side;
the lens group having, in order from the object side toward the image side, a first meniscus lens which has a positive power and is convex on the object side, a second meniscus lens which has a positive power and is convex on the image side, and a third convex lens which has a positive power and is convex on the object side, wherein
a lens surface on the object side of the third convex lens has no inflection point within an effective diameter thereof.

2. The infrared lens unit according to claim 1, wherein a maximum value of a tangent angle of a lens surface on the object side of the third convex lens is 15° or greater.

3. The infrared lens unit according to claim 2, wherein the maximum value of the tangent angle of the lens surface on the object side of the third convex lens is 60° or less.

4. The infrared lens unit according to claim 1, wherein the incidence angle of light beams incident on the interference filter via the lens group and having the prescribed wavelength band of a near-infrared region is 20° or less.

5. The infrared lens unit according to claim 1, wherein the prescribed wavelength band is 800 nm to 900 nm.

6. The infrared lens unit according to claim 1, wherein the first meniscus lens and the second meniscus lens are formed from a material having a refractive index of 1.58 or greater.

7. The infrared lens unit according to claim 6, wherein the first meniscus lens and the second meniscus lens are both made of polycarbonate.

8. The infrared lens unit according to claim 6, wherein the first meniscus lens and the second meniscus lens are both made of pigmented polycarbonate which absorbs light beams of the prescribed wavelength band.

9. The infrared lens unit according to claim 1, wherein the first meniscus lens and the second meniscus lens have an Abbe number of 35 or less.

10. The infrared lens unit according to claim 1, wherein a maximum value of a tangent angle of a lens surface on the object side of the second meniscus lens is 50 to 75°, and
a maximum value of a tangent angle of a lens surface on the image side of the second meniscus lens is 45° to 75°.

11. The infrared lens unit according to claim 1, further comprising:
an aperture on the object side of the lens group.

12. The infrared lens unit according to claim 1, having an angle of view exceeding 65°.

13. An image capture module comprising:
the lens unit according to claim 1, and
an image capture element disposed in a focal position of the lens unit.

14. An image capture device comprising:
the image capture module according to claim 13; and
an illumination device for irradiating an image-capture target with light beams of a prescribed wavelength band in the near-infrared region.

* * * * *